United States Patent
McClintock et al.

(10) Patent No.: US 10,834,051 B2
(45) Date of Patent: *Nov. 10, 2020

(54) PROXY SERVER-BASED MALWARE DETECTION

(71) Applicant: Amazon Technologies, Inc., Seattle, WA (US)

(72) Inventors: Jon Arron McClintock, Seattle, WA (US); Jesper Mikael Johansson, Redmond, WA (US); Andrew Jay Roths, Kenmore, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/389,343

(22) Filed: Dec. 22, 2016

(65) Prior Publication Data

US 2017/0104721 A1    Apr. 13, 2017

Related U.S. Application Data

(63) Continuation of application No. 13/858,505, filed on Apr. 8, 2013, now Pat. No. 9,537,888.

(51) Int. Cl.
*H04L 29/06* (2006.01)
*G08B 21/18* (2006.01)
(Continued)

(52) U.S. Cl.
CPC .......... *H04L 63/0254* (2013.01); *G08B 21/18* (2013.01); *H04L 41/06* (2013.01);
(Continued)

(58) Field of Classification Search
CPC ............. H04L 63/1416; H04L 63/1408; H04L 63/1441; H04L 63/1458
(Continued)

(56) References Cited

U.S. PATENT DOCUMENTS 6,049,876 A    4/2000  Moughanni et al.
6,253,243 B1   6/2001  Spencer
(Continued)

OTHER PUBLICATIONS

Defense Advanced Research Projects Agency (Department of Defense). Anomaly Detection at Multiple Scales (ADAMS). http:I/publicintelligence.net/darpa-fog-computing/ Accessed Sep. 18, 2013.
(Continued)

*Primary Examiner* — Evans Desrosiers
(74) *Attorney, Agent, or Firm* — Thomas | Horstemeyer, LLP

(57) ABSTRACT

Disclosed are various embodiments for malware detection by way of proxy servers. In one embodiment, a proxied request for a network resource from a network site is received from a client device by a proxy server application. The proxied request is analyzed to determine whether the proxied request includes protected information transmitted in an unsecured manner. It is then determined whether the network resource comprises malware based at least in part on an execution of the network resource or whether the proxied request includes the protected information transmitted in the unsecured manner. The proxy server application refrains from sending data generated by the network resource to the client device in response to the proxied request when the network resource is determined to comprise the malware.

20 Claims, 6 Drawing Sheets

(51) Int. Cl.
*H04L 12/24* (2006.01)
*H04L 29/08* (2006.01)

(52) U.S. Cl.
CPC ........ *H04L 63/0281* (2013.01); *H04L 63/145* (2013.01); *H04L 63/1425* (2013.01); *H04L 63/1441* (2013.01); *H04L 67/28* (2013.01)

(58) Field of Classification Search
USPC ......................................................... 726/23
See application file for complete search history.

(56) References Cited

U.S. PATENT DOCUMENTS

| | | |
|---|---|---|
| 7,506,056 B2 | 3/2009 | Satish et al. |
| 7,712,132 B1 | 5/2010 | Ogilvie |
| 8,010,085 B2 | 8/2011 | Apte et al. |
| 8,095,602 B1 | 1/2012 | Orbach |
| 8,095,964 B1 | 1/2012 | Along et al. |
| 8,220,054 B1 | 7/2012 | Lu |
| 8,321,910 B1 * | 11/2012 | English .............. G06F 17/30144 726/2 |
| 8,364,811 B1 | 1/2013 | Erdmann et al. |
| 8,472,619 B1 | 6/2013 | Trimberger |
| 8,528,091 B2 | 9/2013 | Bowen et al. |
| 8,549,643 B1 | 10/2013 | Shou |
| 8,578,486 B2 * | 11/2013 | Lifliand .............. H04L 63/0428 726/22 |
| 8,650,215 B2 | 2/2014 | Little |
| 8,656,462 B2 | 2/2014 | Kailash et al. |
| 8,819,825 B2 | 8/2014 | Keromytis et al. |
| 8,910,284 B1 | 12/2014 | Erdmann et al. |
| 8,955,143 B1 | 2/2015 | Ramalingam et al. |
| 9,152,808 B1 | 10/2015 | Ramalingam et al. |
| 2005/0027822 A1 | 2/2005 | Plaza |
| 2005/0114709 A1 | 5/2005 | Moore |
| 2005/0210534 A1 | 9/2005 | Krishnamurthy |
| 2005/0223001 A1 | 10/2005 | Kester et al. |
| 2006/0004636 A1 | 1/2006 | Kesler et al. |
| 2007/0016951 A1 | 1/2007 | Piccard et al. |
| 2007/0174915 A1 | 7/2007 | Gribble et al. |
| 2007/0289018 A1 | 12/2007 | Steeves et al. |
| 2008/0196082 A1 | 8/2008 | Sandoval et al. |
| 2008/0244742 A1 | 10/2008 | Neystadt et al. |
| 2009/0077383 A1 | 3/2009 | de Monseignat et al. |
| 2009/0113547 A1 | 4/2009 | Higashikado |
| 2010/0024014 A1 | 1/2010 | Kailash et al. |
| 2010/0077483 A1 | 3/2010 | Stolfo et al. |
| 2010/0125903 A1 | 5/2010 | Devarajan et al. |
| 2010/0269177 A1 | 10/2010 | Bennett |
| 2012/0047284 A1 | 2/2012 | Tarkoma |
| 2012/0084866 A1 | 4/2012 | Stolfo |
| 2012/0110666 A1 | 5/2012 | Ogilvie |
| 2012/0117653 A1 | 5/2012 | Chow et al. |
| 2012/0151585 A1 | 6/2012 | Lamastra et al. |
| 2013/0007882 A1 * | 1/2013 | Devarajan .......... H04L 63/1416 726/24 |
| 2013/0167236 A1 | 6/2013 | Sick |

OTHER PUBLICATIONS

Shachtman, Noah. Feds Look to Fight Leaks with 'Fog of Disinformation'. Wired Magazine, Jul. 3, 2012. Online content: http://www.wired.com/dangerroom/2012/07/fog-computing/. Accessed Sep. 18, 2013.
FireEye Next Generation Threat Protection, Milpitas, CA, pp. 1-4.

* cited by examiner

PROXY SERVER-BASED MALWARE DETECTION

CROSS-REFERENCE TO RELATED APPLICATIONS

This application is a continuation of U.S. patent application Ser. No. 13/858,505, entitled "PROXY SERVER-BASED MALWARE DETECTION," and filed on Apr. 8, 2013, which is incorporated herein by reference in its entirety.

BACKGROUND

Malware is an increasing problem for network content. Many nefarious network sites are created solely for the purpose of distributing malware to unsuspecting visitors. Further, nefarious users may exploit security vulnerabilities of legitimate network sites to distribute malware. Unfortunately, security vulnerabilities of user systems are often discovered and exploited before the systems can be effectively patched and updated.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to detection of malware using a proxy server. For various reasons, client devices may be configured to access network resources by way of a proxy server. Rather than initiating a network resource request to a network site directly, a client device behind a proxy server is instead configured to send the network resource request to the proxy server. The proxy server then obtains the network resource from the network site and then returns the network resource to the requesting client device.

The proxy server may be configured to cache the network resource to provide faster downloads and/or reduce bandwidth consumption for subsequent accesses of the network resource by client devices. The proxy server may be configured to perform various preprocessing functionality on the network resource (e.g., reduce image sizes, execute scripts, remove banner advertisements, etc.) before returning the network resource to the client device. Additionally, the proxy server may be configured to perform filtering functionality to prevent client devices from accessing objectionable material.

Various embodiments of the present disclosure facilitate malware detection using resources of a proxy server. To this end, a proxy server may be considered a "choke point" through which all client device network traffic passes. Accordingly, the browsing history for one or more client devices may be observed and generated in the proxy server. The browsing history may be analyzed in connection with a determination of malware in order to determine the source of the malware. Further, the proxied requests may be analyzed to determine whether they embody characteristics of malware. In one embodiment, the client devices may be configured to report telemetry data regarding execution of a network resource, and a determination of malware may be made based at least in part on the telemetry data or the absence of such telemetry data. In the following discussion, a general description of the system and its components is provided, followed by a discussion of the operation of the same.

Figure 1:
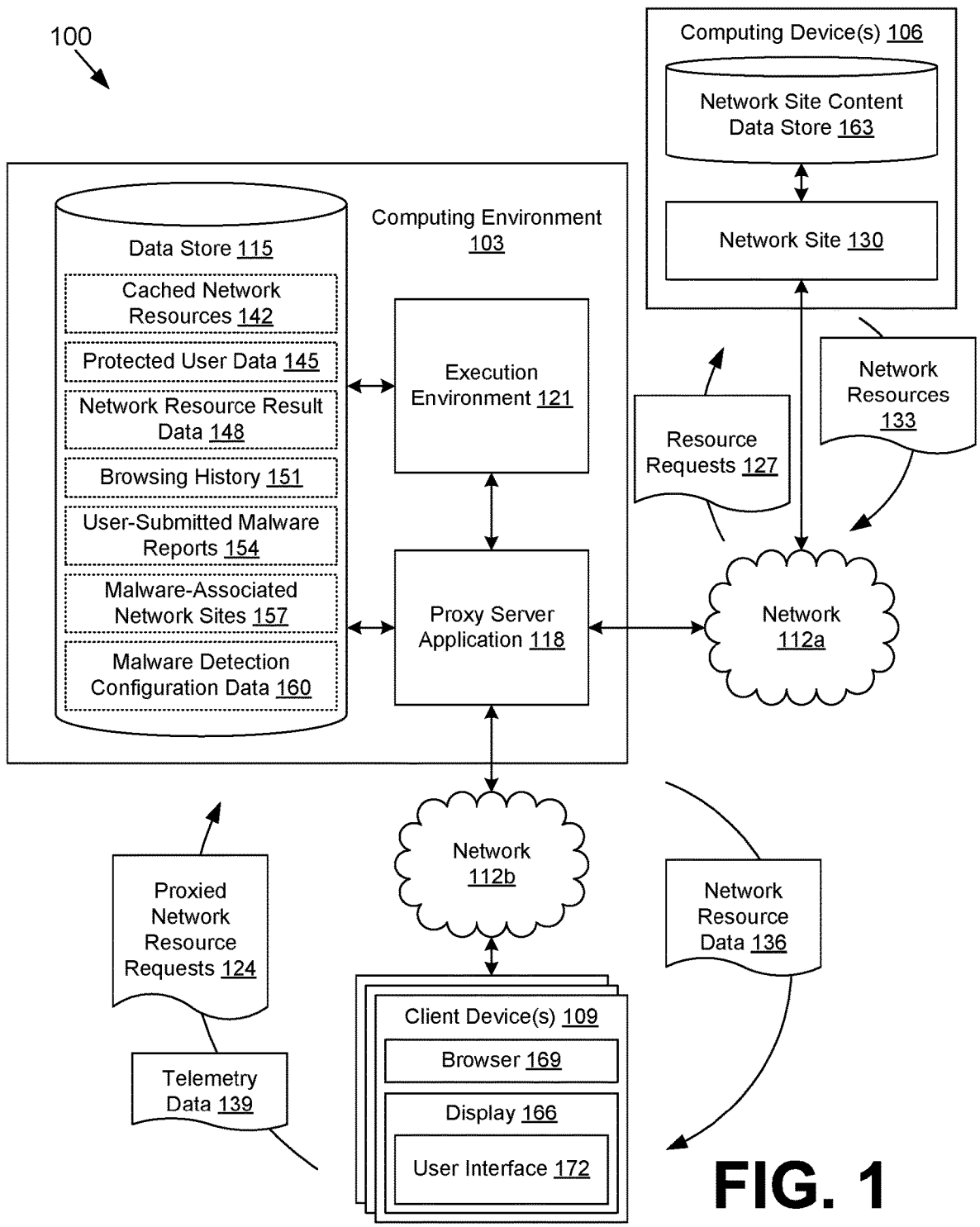
FIG. 1 is a drawing of a networked environment according to various embodiments of the present disclosure.

With reference to FIG. 1, shown is a networked environment 100 according to various embodiments. The networked environment 100 includes a computing environment 103, one or more computing devices 106, and one or more client devices 109 in data communication via networks 112a and 112b. The networks 112a and 112b may include, for example, the Internet, intranets, extranets, wide area networks (WANs), local area networks (LANs), wired networks, wireless networks, or other suitable networks, etc., or any combination of two or more such networks. In one embodiment, the networks 112a and 112b correspond to the same network. In another embodiment, the networks 112a and 112b correspond to different networks, where the client device 109 is in data communication with the computing environment 103 via the network 112b and the computing environment 103 is in data communication with the computing devices 106 via the network 112a. The network 112b may be separated from the network 112a by way of one or more firewalls, gateways, routers, or other network devices.

The computing environment 103 may comprise, for example, a server computer or any other system providing computing capability. Alternatively, the computing environment 103 may employ a plurality of computing devices that are arranged, for example, in one or more server banks or computer banks or other arrangements. Such computing devices may be located in a single installation or may be distributed among many different geographical locations. For example, the computing environment 103 may include a plurality of computing devices that together may comprise a cloud computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 115 that is accessible to the computing environment 103. The data store 115 may be representative of a plurality of data stores 115 as can be appreciated. The data stored in the data store 115, for example, is associated with the operation of the various applications and/or functional entities described below.

The components executed by the computing environment 103, for example, include a proxy server application 118, an execution environment 121, and other applications, services, processes, systems, engines, or functionality not discussed in detail herein. The proxy server application 118 is executed to receive proxied network resource requests 124 from client devices 109 via the network 112b, and in turn generate resource requests 127 sent via the network 112a to network sites 130 hosted by the computing devices 106. In response to the resource requests 127, the proxy server application 118 receives network resources 133 from the network site 130, and the proxy server application 118 may then send network resource data 136 based on the network resources 133 to the client devices 109 via the network 112b. The proxy server application 118 may receive telemetry data 139 and/or other data from the client devices 109. As will be described, the proxy server application 118 is configured to determine whether network resources 133 are associated with malware and to implement actions responsive to such a determination.

The execution environment 121 corresponds to an environment in which the network resources 133 may be executed or processed within the computing environment 103. Such execution may customarily occur at the client devices 109, and the execution may be moved to the computing environment 103 for performance reasons. Additionally, the behavior of the network resource 133 when executed may weigh towards a determination of malware for the network resource 133. The execution environment 121 may be configured as a sandbox, where a sandbox violation may weigh towards a determination of malware. In one embodiment, the execution environment 121 may be configured to emulate or virtualize a client platform, possibly including a browser and/or other applications. The execution environment 121 may be configured to mimic the configuration of the client device 109 (e.g., browser version, installed applications, operating system version, etc.) for malware-assessment purposes. Execution of the network resource 133 may, for example, involve execution of JavaScript or other client-executable code in order to render a network page such as a hypertext markup language (HTML) page, extensible markup language (XML) page, or other page.

The data stored in the data store 115 includes, for example, cached network resources 142, protected user data 145, network resource result data 148, browsing history 151, user-submitted malware reports 154, malware-associated network sites 157, malware detection configuration data 160, and potentially other data. The cached network resources 142 include network resources 133 that have been cached by the proxy server application 118 in order to fulfill future proxied network resource requests 124 from client devices 109 without having to retrieve the same network resources 133 again.

The protected user data 145 corresponds to data associated with users of the client devices 109 that is considered protected data. Such data may include credit card numbers, banking account information, passwords and other security credentials, social security numbers, and/or other sensitive information. In one embodiment, the protected user data 145 stores the actual sensitive data. In another embodiment, the protected user data 145 stores hashes or other profiles of the actual sensitive data.

The network resource result data 148 may include data generated as a result of execution of a network resource 133 by the execution environment 121. For example, a script network resource 133 may be executed in the execution environment 121 to render an HTML document. The resulting HTML document may be served up to the client devices 109 as the network resource data 136 and/or stored in the network resource result data 148.

The browsing history 151 records the proxied network resource requests 124 received from a plurality of client devices 109. The browsing history 151 may capture all of the data associated with the proxied network resource requests 124 or a subset of the data, e.g., a universal resource locator (URL), form data, etc. In one embodiment, the browsing history 151 includes times and/or other data associated with the proxied network resource requests 124. Where telemetry data 139 is obtained from the client device 109, the telemetry data 139 may be stored in the browsing history 151 in association with proxied network resource requests 124.

The user-submitted malware reports 154 may include manual reports of malware submitted by users of client devices 109 and/or other users. In one embodiment, the user-submitted malware reports 154 may include indications of malware submitted by a security application executed by the client device 109.

The malware-associated network sites 157 correspond to those network sites 130 that are associated with a determination of malware by the proxy server application 118. The malware-associated network sites 157 may be categorized as being on a blocked list (e.g., accesses to such network sites 130 are blocked through the proxy server application 118), a warning list (e.g., a warning is generated when a client device 109 requests resources from such network sites 130), or another categorization. The malware-associated network sites 157 may be associated with different confidence levels as to whether the malware-associated network sites 157 are in fact malware associated. The malware-associated network sites 157 may be associated with different threat levels as to the danger posed by the associated malware.

The malware detection configuration data 160 includes various parameters that configure the detection of malware by the proxy server application 118. Specifically, such parameters may define abnormalities in telemetry data 139, recognition of protected user data 145 in unsecured proxied network resource requests 124, recognition of malware on the basis of user-submitted malware reports 154, recognition of malware within the execution environment 121, and/or other features.

The computing device 106 may comprise, for example, a server computer or any other system providing computing capability. Alternatively, the computing device 106 may employ a plurality of computing devices 106 that are arranged, for example, in one or more server banks or computer banks or other arrangements. Such computing devices 106 may be located in a single installation or may be distributed among many different geographical locations. For example, the computing device 106 may correspond to a plurality of computing devices 106 that together may comprise a cloud computing resource, a grid computing resource, and/or any other distributed computing arrangement. In some cases, the computing device 106 may correspond to an elastic computing resource where the allotted capacity of processing, network, storage, or other computing-related resources may vary over time.

Various applications and/or other functionality may be executed in the computing device 106 according to various embodiments. Also, various data is stored in a network site content data store 163 that is accessible to the computing environment 103. The network site content data store 163 may be representative of a plurality of network site content data stores 163 as can be appreciated. The data stored in the network site content data store 163, for example, is associated with the operation of the various applications and/or functional entities described below.

The components executed by the computing environment 103, for example, include a network site 130 and other applications, services, processes, systems, engines, or functionality not discussed in detail herein. The network site 130 may comprise a web site or other form of network content provider. To this end, the network site 130 may comprise a hypertext transfer protocol (HTTP) server. Non-limiting examples of commercially available HTTP servers include Apache® HTTP Server, Apache® Tomcat®, Microsoft® Internet Information Services (IIS), and others. The network site 130 may serve up various network resources 133 stored in, or generated from data stored in, the network site content data store 163. Such network resources 133 may comprise HTML, XML, applets, cascading style sheets (CSS), scripts, images, audio, video, portable document format (PDF) documents, executable programs, and/or other network resources 133.

The client device 109 is representative of a plurality of client devices 109 that may be coupled to the network 112b. The client device 109 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 109 may include a display 166. The display 166 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 109 may be configured to execute various applications such as a browser 169 and/or other applications. The browser 169 may be executed in a client device 109, for example, to access network content served up by the computing environment 103, the computing devices 106, and/or other servers, thereby rendering a user interface 172 on the display 166. The browser 169 may be configured to use the proxy server application 118 rather than request resources directly from the network sites 130. Alternatively, gateway devices in the network 112b may be configured to transparently route certain types of network traffic originating in the client device 109 (e.g., traffic via transmission control protocol (TCP) port 80 and/or other ports) to the proxy server application 118. The client device 109 may be configured to execute applications beyond the browser 169 such as, for example, browsers, mobile applications, security applications, email applications, social networking applications, and/or other applications.

Next, a general description of the operation of the various components of the networked environment 100 is provided. To begin, the browser 169 is configured to employ the proxy server application 118 as a proxy. Such a configuration may be manual or automatic. Alternatively, the network 112b may be configured to intercept and transparently route certain network traffic to the proxy server application 118 without any particular configuration of the client device 109. As a result of a user browsing a network site 130 or entering a particular URL, the browser 169 issues one or more proxied network resource requests 124, which are transmitted to the proxy server application 118 via the network 112b.

The proxy server application 118 in response issues a resource request 127 to the network site 130 via the network 112a, thereby obtaining a network resource 133. Alternatively, the network resource 133 may be loaded from the cached network resources 142. The proxy server application 118 may perform processing on the network resource 133. Thereafter, the proxy server application 118 returns network resource data 136 to the browser 169 via the network 112b. The browser 169 may then render a user interface 172 based at least in part on the network resource data 136.

The proxy server application 118 may be configured to determine a source of malware based at least in part on browsing history 151. For example, the proxy server application 118 may receive indications of malware from security applications of multiple client devices 109, or processing within the computing environment 103 may indicate malware in connection with a network resource 133. In one embodiment, it may be determined that an account associated with the client device 109 has been compromised. The proxy server application 118 may determine a source of the malware from the browsing history 151 based upon the infected client devices 109 accessing a network site 130 in common, a network resource 133 in common, and so on. Various techniques relating to detecting a source of malware using browsing history are disclosed in U.S. patent application Ser. No. 12/827,478 entitled "DETECTING MALWARE" and filed on Jun. 30, 2010, which issued as U.S. Pat. No. 8,364,811 on Jan. 29, 2013, and which is incorporated herein by reference in its entirety.

The proxy server application 118 may be configured to detect malware according to various approaches. To begin, the proxy server application 118 may be configured to examine the proxied network resource requests 124 for indications of malware. For example, some malware may be configured to transmit sensitive or customarily protected information in an unsecured manner (e.g., in clear text, etc.) to a nefarious network site 130. In other words, malware may transmit credit card numbers, social security numbers, passwords, etc. to the nefarious network sites 130 in a manner not associated with legitimate network sites 130.

The proxy server application 118 may detect such protected information by scanning the proxied network resource requests 124 for data matching some generic profile for the protected information. As an example, a sixteen digit number that can be validated by a Luhn checksum is likely an unencrypted credit card number. As another example, the protected information may be detected in the proxied network resource requests 124 using generalized regular expressions for social security numbers, email addresses, etc. As another example, an unencrypted data field resulting from a form input type "password" in HTML is likely to be an unencrypted password. To detect such a data field, the proxy server application 118 may examine the network resource data 136 returned to the client device 109 which contained a form that led to the submission embodied within the proxied network resource request 124.

Alternatively, the proxy server application 118 may detect protected information by comparing data in the proxied network resource requests 124 to verified protected user data 145. For example, the protected user data 145 may store actual credit card numbers, social security numbers, passwords, and other sensitive data. The proxy server application 118 may compare the contents of the proxied network resource requests 124 to determine whether any of the protected user data 145 appears in an unsecured manner in the proxied network resource requests 145.

For security purposes, the protected user data 145 may correspond to hashes of the actual data. In such a case, the proxy server application 118 may generate hashes of data embodied within the proxied network resource requests 124 to determine matches to the hashed protected user data 145. In one embodiment, the analysis described above with respect to the proxied network resource requests 124 may be performed by dedicated reconfigurable computer hardware due to computational complexity. Such reconfigurable computer hardware may include field programmable gate arrays (FPGAs), field programmable object arrays (FPOAs), memristor arrays, and/or other reconfigurable hardware.

Another approach to malware detection may involve the proxy server application 118 analyzing the proxied network resource requests 124 for unusual or repetitive patterns. For example, a client device 109 infected with malware may begin making repetitive proxied network resource requests 124 to a particular network site 130 to report data and/or receive control instructions. When multiple client devices 109 begin contacting such a network site 130, it may be determined that the client devices 109 may be infected with malware. The time of day or day of the week may also be significant to malware determinations. If client devices 109 never make proxied network resource requests 124 at 5 am but suddenly begin doing so, the client devices 109 may be infected with malware. Similarly, if client devices 109 associated with a business never or seldom make proxied network resource requests 124 on Saturdays when the business is closed but suddenly begin doing so, the client devices 109 may be infected with malware. The duration of the activity may also be significant.

In yet another approach, the client device 109 may be configured to report telemetry data 139 to the proxy server application 118 in response to receiving the network resource data 136. Absence of expected telemetry data 139 may be an indicator that the client device 109 has crashed, which may be a strong indicator of malware. The telemetry data 139 may indicate memory consumption, data storage usage, network connections, process state, system configuration data, and/or other status information for the client device 109 that may indicate malware. Such system configuration data may report new device drivers being installed, new applications being installed, new users being added, and so on. The telemetry data 139 may indicate that network resource data 136 has resulted in high memory usage, significant data usage, numerous network connections, processes being spawned, or other abnormalities, which may lead to a determination of malware.

In still another approach to detecting malware, the proxy server application 118 may be configured to execute or otherwise examine the network resource 133 via the execution environment 121. In one embodiment, the examination via the execution environment 121 may be triggered by a threshold determination of malware from browsing history 151 and/or other data. The execution environment 121 may be configured to emulate or mimic the operating system environment, browser version, and other configuration characteristics of the client device 109.

The behavior of the executed network resource 133 may be observed by the execution environment 121, and negative behaviors noted. Such negative behaviors may include unexpected external network connections, high processor usage, high memory usage, sensitive data accesses, and/or other behaviors. The existence of such behaviors may result in a determination of malware. The network resource result data 148 may be returned to the client device 109 as network resource data 136 and/or retained in the data store 115 for further analysis. The proxy server application 118 may also be configured to detect proxy busting, or the practice of malware being configured to avoid using a proxy by way of secure sockets layer (SSL) connections, TCP connections via other ports, and other approaches.

In one embodiment, the proxy server application 118 may detect accesses of canary data, or data that is hidden from users within a user interface 172. Such a user interface 172 may correspond to a remote file explorer. Such canary data may be exposed to malware via an application programming interface (API). Malware may be configured to access files or other resources automatically via the API, including the canary data. Such an automatic access of otherwise hidden data could be an indicator of malware. Various techniques relating to the use of canary or decoy data are described in U.S. patent application Ser. No. 13/602,466 entitled "USE OF DECOY DATA IN A DATA STORE" and filed on Sep. 4, 2012, and in U.S. patent application Ser. No. 13/849,772 entitled "ADAPTING DECOY DATA PRESENT IN A NETWORK" and filed on Mar. 25, 2013, both of which are incorporated herein by reference in their entirety.

Additionally, the proxy server application 118 may receive user-submitted malware reports 154. A determination of malware may be made based at least in part on such user-submitted malware reports 154. It is noted that several of the factors and/or approaches discussed herein may be employed to make a determination of malware. The determination may be associated with a confidence level and/or a threat level which may influence actions taken in response to the determination.

In response to a determination of malware for a network site 130 and/or particular network resources 133 of the network site 130, the proxy server application 118 may implement various actions. The choice of actions to implement may be made based at least in part on a confidence level and/or threat level associated with the malware determination. The strongest actions may involve blocking all proxied network resource requests 124 for the network site 130 or portions of the network site 130. A weaker action may involve encoding a warning in user interface data to be rendered by the browser 169, which may request a configuration from the user before proceeding with the network site 130.

The proxy server application 118 may log an indication of the source of the malware, e.g., for further manual review. In one embodiment, the proxy server application 118 may be capable of removing malware from a network resource 133 before returning the network resource data 136 to the client device 109. Accounts corresponding to client devices 109 associated with a determination of malware may be added to a watch list for extra scrutiny.

Figure 2A:
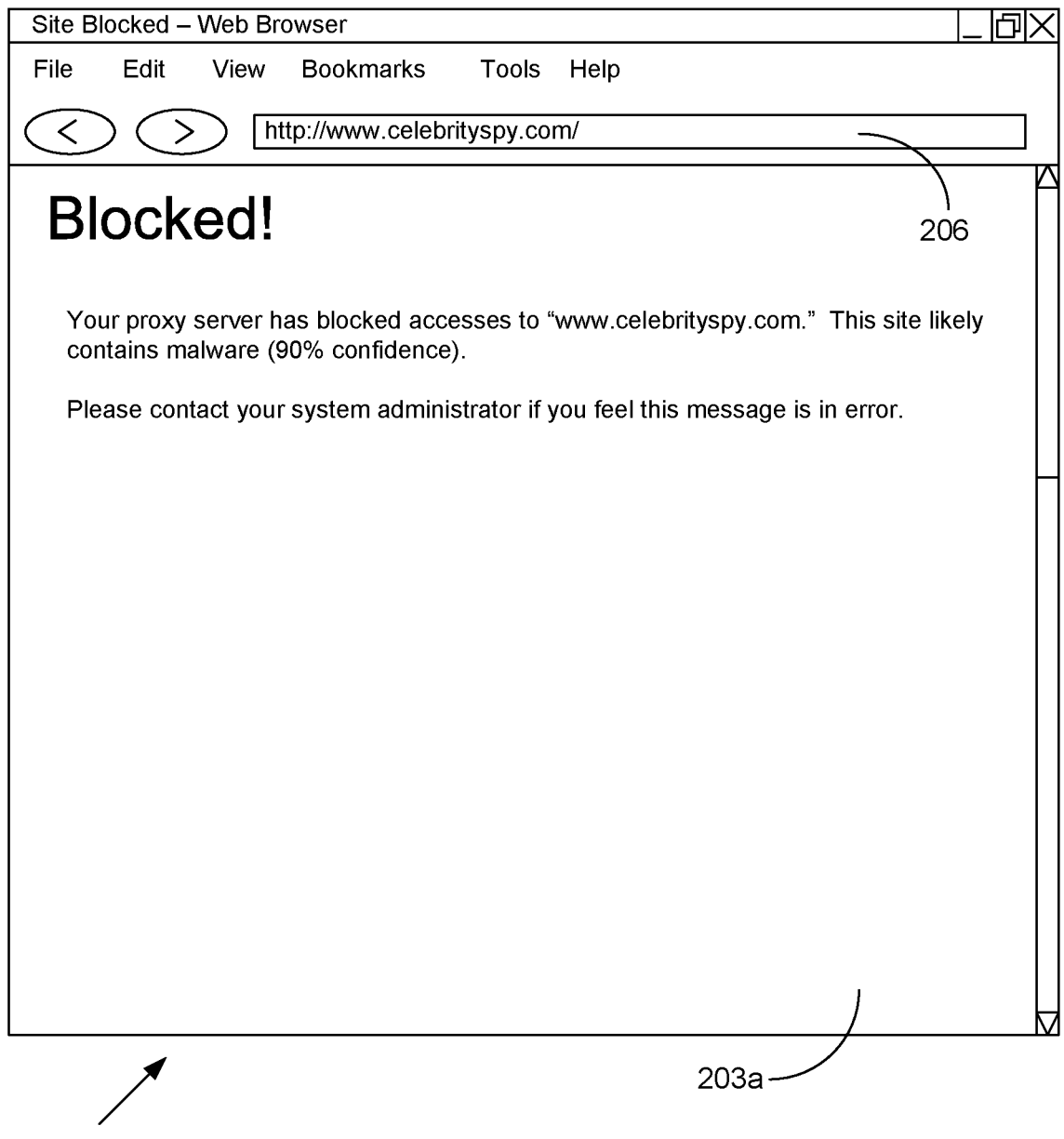
FIGS. 2A and 2B are drawings of example user interfaces rendered by a client device in the networked environment of FIG. 1 according to various embodiments of the present disclosure.

Referring next to FIG. 2A, shown is an example user interface 172a rendered by a browser 169 (FIG. 1) executed by a client device 109 (FIG. 1) in the networked environment 100 (FIG. 1) according to various embodiments. Specifically, the user interface 172a depicts a network page 203a that includes a notification that a particular network site 130 (FIG. 1) ("www.celebrityspy.site") has been blocked in response to a determination of malware. In this case, the determination is associated with a "90% confidence" level, thus leading to the network site 130 being completely blocked. The URL of the network site 130 is displayed in the address bar 206, but the network page 203a is generated by the proxy server application 118 (FIG. 1). In another scenario, the address bar 206 may indicate a URL of a management site rather than the URL of the network site 103. Since the network site 130 is blocked, the network page 203a provides no option to the user to continue to the content of the network site 130. In another embodiment, a login form may be provided for a user (e.g., a system administrator) to authenticate in order to bypass the blocking of the network site 130.

Figure 2B:
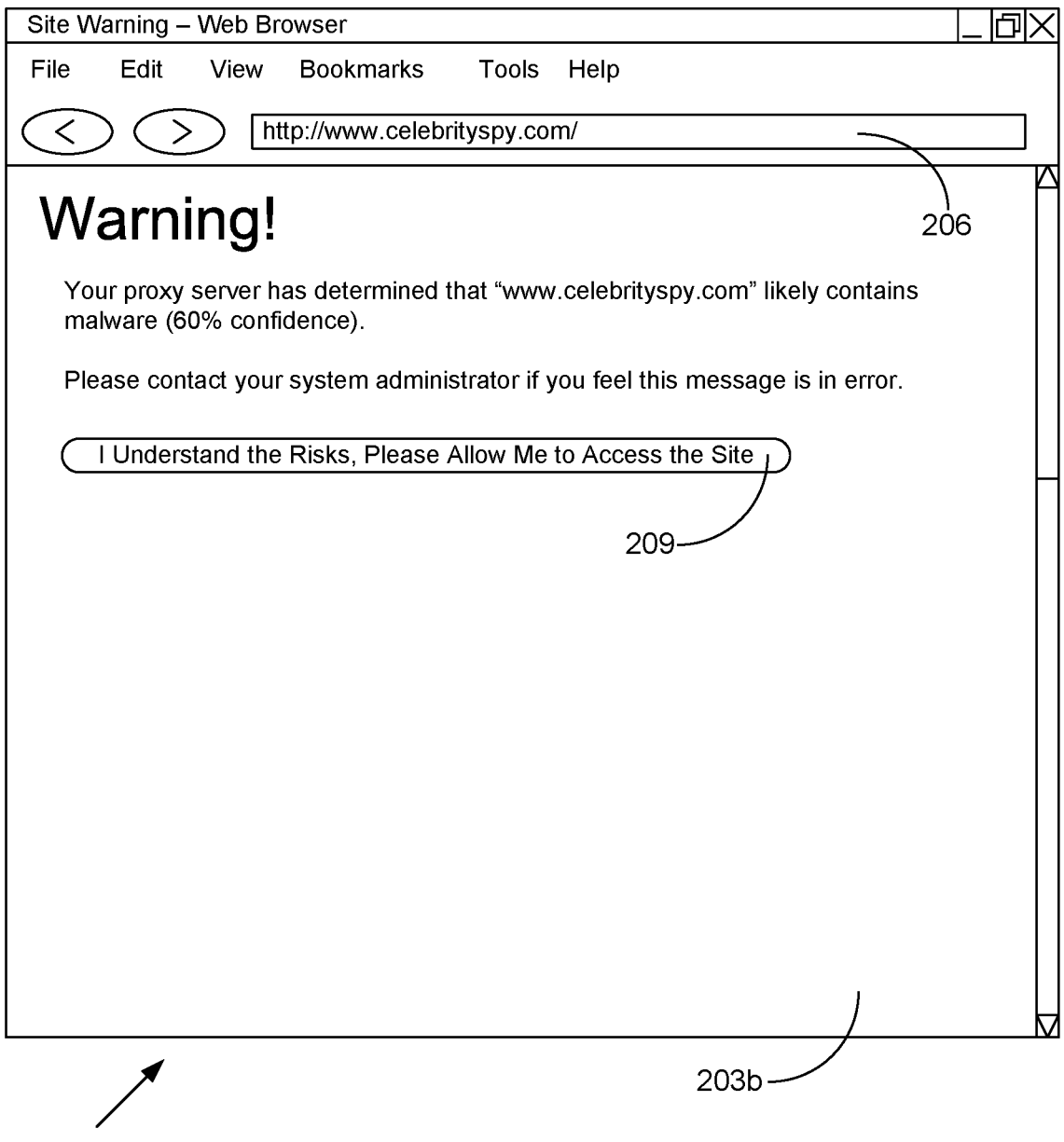

Turning now to FIG. 2B, shown is another example user interface 172b rendered by a browser 169 (FIG. 1) executed by a client device 109 (FIG. 1) in the networked environment 100 (FIG. 1) according to various embodiments. Specifically, the user interface 172b depicts a network page 203a that includes a notification that a particular network site 130 (FIG. 1) ("www.celebrityspy.site") is associated with a likely determination of malware. In this case, the determination is associated with a "60% confidence" level, thus leading to a warning that can be bypassed. The URL of the network site 130 is displayed in the address bar 206, but the network page 203a is generated by the proxy server application 118 (FIG. 1). The user may select a bypass component 209 in order to bypass the warning and continue on the network site 130.

In one embodiment, certain users or client devices 109 may be whitelisted to receive a warning rather than be blocked from accessing the particular network site 130. The client device 109 may be whitelisted based upon network address, user identity, Kerberos identity, device identity, and/or other criteria. For example, it may be useful for a system administrator to be able to access the network site 130 for inspection purposes. In another embodiment, whether the network site 130 is blocked or a mere warning is generated may depend upon the status of the browser 169. If the browser 169 is current or patched, a mere warning may be generated. By contrast, if the browser 169 is not current, unpatched, or otherwise vulnerable, the network site 130 may be blocked.

Figure 3A:
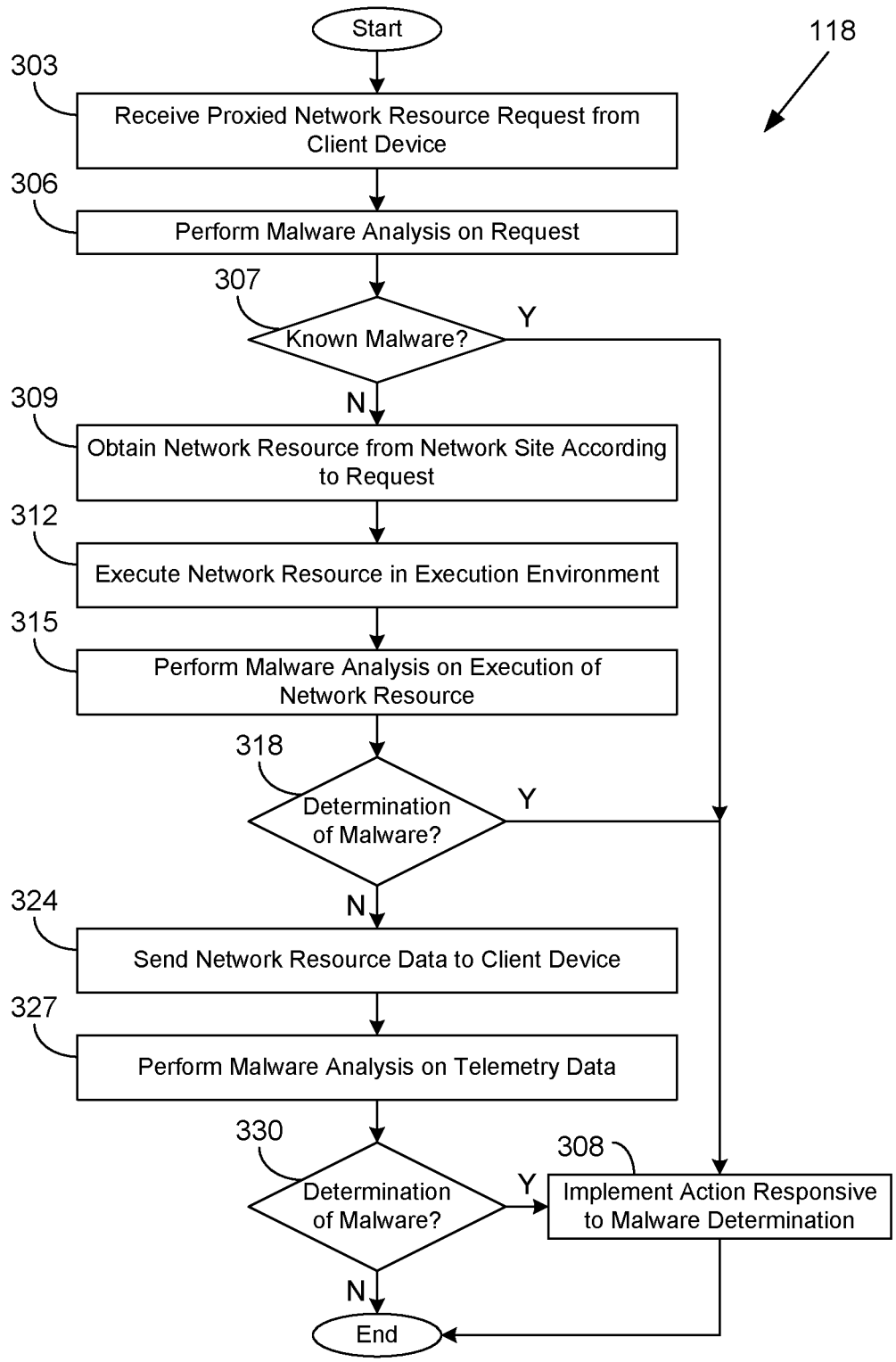
FIGS. 3A and 3B are flowcharts illustrating examples of functionality implemented as portions of a proxy server application executed in a computing environment in the networked environment of FIG. 1 according to various embodiments of the present disclosure.

Referring next to FIG. 3A, shown is a flowchart that provides one example of the operation of a portion of the proxy server application 118 according to various embodiments. It is understood that the flowchart of FIG. 3A provides merely an example of the many different types of functional arrangements that may be employed to implement the operation of the portion of the proxy server application 118 as described herein. As an alternative, the flowchart of FIG. 3A may be viewed as depicting an example of steps of a method implemented in the computing environment 103 (FIG. 1) according to one or more embodiments.

Beginning with box 303, the proxy server application 118 receives a proxied network resource request 124 (FIG. 1) from a client device 109 (FIG. 1) via the network 112b (FIG. 1). In box 306, the proxy server application 118 performs a malware analysis on the proxied network resource request 124. For example, the proxy server application 118 may determine whether protected user data 145 is transmitted in an unsecure manner, whether the proxied network resource request 124 is part of a periodic pattern of unusual requests, and/or other malware-associated characteristics.

In box 307, the proxy server application 118 determines whether the proxied network resource request 124 is associated with known malware. If so, the proxy server application 118 proceeds to box 308 and implements an action responsive to the malware determination. For example, the proxy server application 118 may return a warning or blocked site message to the client device 109. Thereafter, the portion of the proxy server application 118 ends.

If the proxy server application 118 instead determines in box 307 that the proxied network resource request 124 is not associated with known malware, the proxy server application 118 continues to box 309. In box 309, the proxy server application 118 obtains a network resource 133 (FIG. 1) from a network site 130 (FIG. 1) via the network 112a (FIG. 1) according to the proxied network resource request 124.

In box 312, the proxy server application 118 executes the network resource 133 in the execution environment 121 (FIG. 1). In one embodiment, the network resource 133 may be executed in the execution environment 121 if the network resource 133 is correlated with malware based at least in part on the browsing history 151 (FIG. 1) for multiple client devices 109, where the browsing history 151 is observed by the proxy server application 118. In box 315, the proxy server application 118 performs a malware analysis on the execution of the network resource 133. For example, the proxy server application 118 may determine whether the execution of the network resource 133 results in improper network connections, proxy busting, high resource usage, improper data accesses, and/or other malware characteristics.

In box 318, the proxy server application 118 evaluates whether a determination of malware is made. If a determination of malware is made, the proxy server application 118 proceeds to box 308 and implements an action responsive to the malware determination. For example, the proxy server application 118 may block the network site 130, add the network site 130 to a warning list, refrain from sending the network resource data 136 (FIG. 1) to the client device 109, or perform other actions. Thereafter, the portion of the proxy server application 118 ends.

If a determination of malware is not made in box 318, the proxy server application 118 continues to box 324 and sends the network resource data 136 to the client device 109 via the network 112b. The proxy server application 118 may then obtain telemetry data 139 (FIG. 1) from the client device 109. In box 327, the proxy server application 118 performs a malware analysis on the telemetry data 139. High resource consumption and/or other issues in the telemetry data 139 may weigh towards a malware determination, as does the absence of telemetry data 139 (i.e., the client device 109 may have crashed). In box 330, the proxy server application 118 again evaluates whether a determination of malware is made. If a determination of malware is made, the proxy server application 118 proceeds to box 308 and implements an action responsive to the malware determination. Thereafter, or if a determination of malware is not made in box 330, the portion of the proxy server application 118 ends.

Figure 3B:
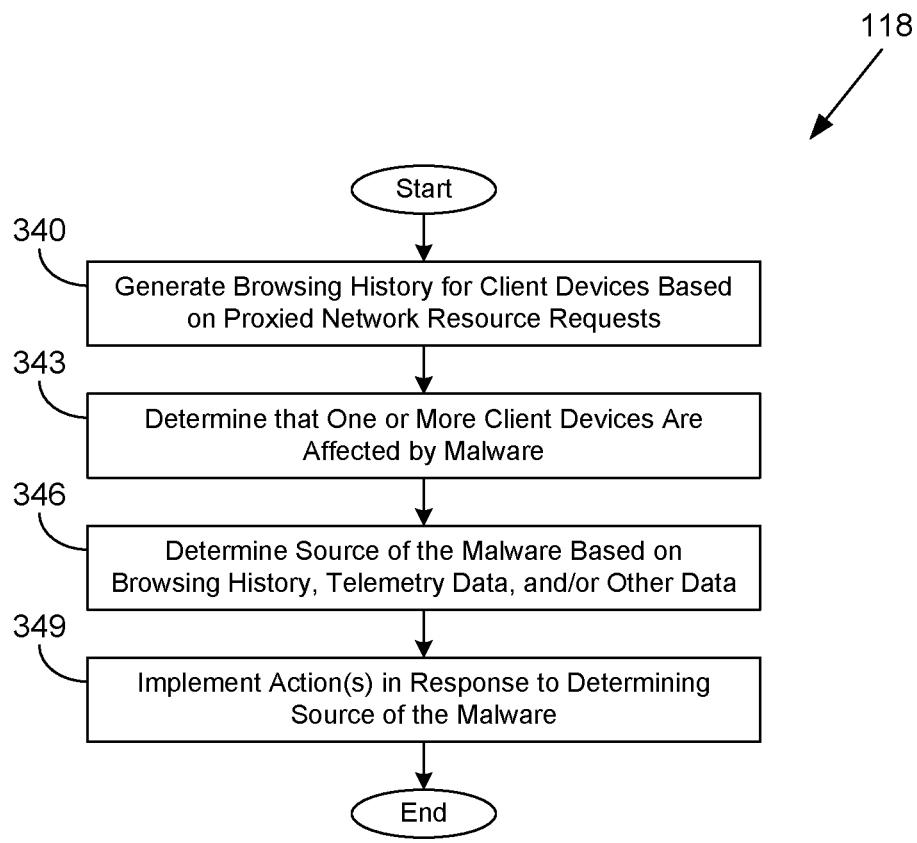

Moving on to FIG. 3B, shown is a flowchart that provides one example of the operation of another portion of the proxy server application 118 according to various embodiments. It is understood that the flowchart of FIG. 3B provides merely an example of the many different types of functional arrangements that may be employed to implement the operation of the portion of the proxy server application 118 as described herein. As an alternative, the flowchart of FIG. 3B may be viewed as depicting an example of steps of a method implemented in the computing environment 103 (FIG. 1) according to one or more embodiments.

Beginning with box 340, the proxy server application 118 generates a browsing history 151 (FIG. 1) for client devices 109 (FIG. 1) based at least in part on proxied network resource requests 124 (FIG. 1) received from the client devices 109. In box 343, the proxy server application 118 determines that one or more of the client devices 109 are affected by malware. For example, the proxy server application 118 may receive an indication of malware from a security application of the client device 109, receive an indication that an associated customer account has been compromised, and/or receive other malware indications.

In box 346, the proxy server application 118 determines a source of the malware based at least in part on the browsing history 151 and/or other observable network behavior for the client devices 109. Such a source may be a network site 130 (FIG. 1) in common to browsing history 151 associated with the affected client devices 109. The proxy server application 118 may also employ telemetry data 139 (FIG. 1) (or the absence of telemetry data 139) to identify malware sources. Other data such as installed client applications, browser versions, etc. may be employed to determine malware sources. In box 349, the proxy server application 118 implements one or more actions responsive to determining the source of the malware. The proxy server application 118 may block a network site 130, add a network site 130 to a warning list, log the source of the malware, determine other client devices 109 that are affected by the malware based at least in part on the source of the malware and the browsing history 151, add affected customer accounts to a watch list, or perform other actions. Thereafter, the portion of the proxy server application 118 ends.

Figure 4:
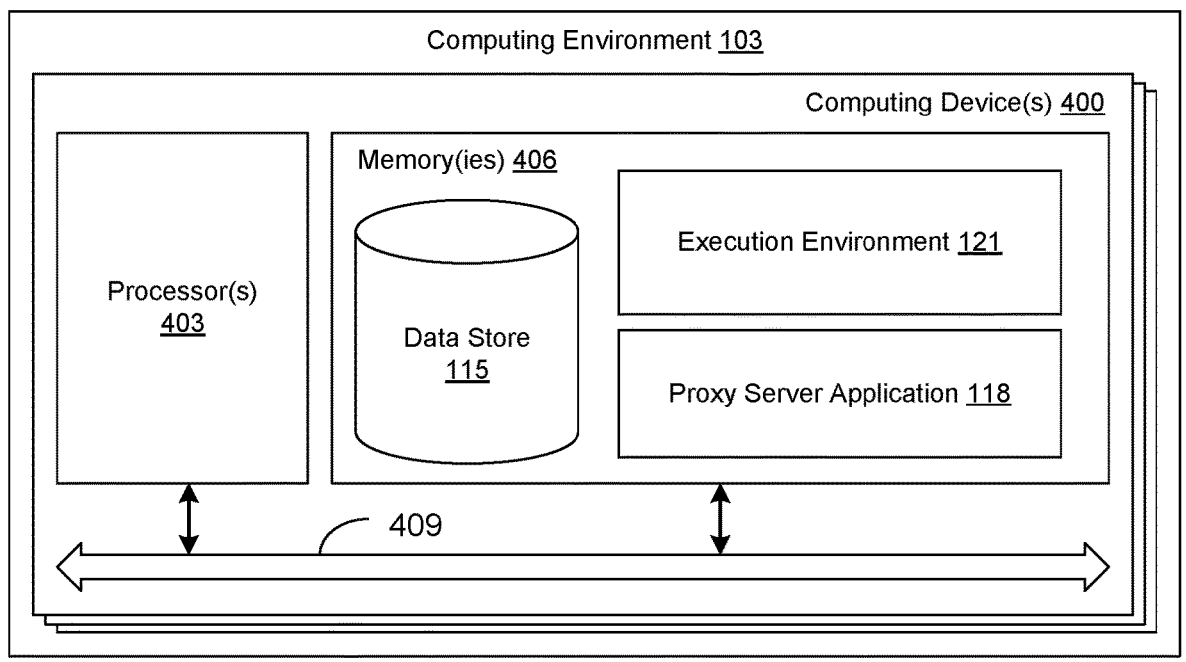
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 103 according to an embodiment of the present disclosure. The computing environment 103 includes one or more computing devices 400. Each computing device 400 includes at least one processor circuit, for example, having a processor 403 and a memory 406, both of which are coupled to a local interface 409. To this end, each computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the proxy server application 118, the execution environment 121, and potentially other applications. Also stored in the memory 406 may be a data store 115 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the proxy server application 118, the execution environment 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3A and 3B show the functionality and operation of an implementation of portions of the proxy server application 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 3A and 3B show a specific order of execution, it is understood that the order of execution may differ from that which is depicted. For example, the order of execution of two or more blocks may be scrambled relative to the order shown. Also, two or more blocks shown in succession in FIGS. 3A and 3B may be executed concurrently or with partial concurrence. Further, in some embodiments, one or more of the blocks shown in FIGS. 3A and 3B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the proxy server application 118 and the execution environment 121, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
  at least one computing device; and
  a proxy server application executable in the at least one computing device, wherein when executed the proxy server application causes the at least one computing device to at least:
    receive a proxied request from a client device for a network resource from a network site;
    analyze the proxied request to determine whether the proxied request includes protected information transmitted in an unsecured manner;
    determine that the client device is affected by malware based at least in part on the proxied request including the protected information transmitted in the unsecured manner; and
    refrain from sending data generated by the network resource to the client device in response to determining that the client device is affected by the malware.

2. The system of claim 1, wherein when executed the proxy server application further causes the at least one computing device to at least:
  receive the network resource from the network site;
  execute the network resource within an execution environment, the execution environment being configured to mimic a configuration of the client device; and
  determine whether the network resource comprises malware further based at least in part on the execution of the network resource.

3. The system of claim 1, wherein when executed the proxy server application further causes the at least one computing device to at least:
  determine a source of the malware based at least in part on the proxied request or telemetry data received from the client device by the proxy server application; and
  implement an action in response to determining the source of the malware.

4. The system of claim 3, wherein the action comprises blocking proxied requests by the client device for network resources of the network site corresponding to the source of the malware.

5. The system of claim 3, wherein the action comprises logging an indication of the source of the malware or generating an alert including the indication of the source of the malware.

6. The system of claim 3, wherein the action comprises determining that another client device is affected by the malware based at least in part on another proxied request received from the other client device, the other proxied request being associated with the source of the malware.

7. The system of claim 3, wherein the action comprises configuring a warning to be returned to another client device in response to proxied requests by the other client device for network resources of the network site corresponding to the source of the malware.

8. The system of claim 3, wherein the action comprises configuring processing of a proxied network resource received from the source of the malware by the proxy server application to remove the malware before returning the proxied network resource to the client device.

9. The system of claim 3, wherein the client device is configured to report the telemetry data to the proxy server application in response to receiving a proxied network resource from the proxy server application, and determining that the client device is affected by the malware further comprises:
  determining that the client device is affected by the malware in response to detecting at least one of:
    an absence of the telemetry data expected to be received from the client device, or
    an abnormality in the telemetry data received from the client device.

10. The system of claim 9, wherein the abnormality is detected from at least one of: memory consumption data, data storage usage data, network connection data, system configuration data, or process state data.

11. The system of claim 1, wherein the protected information transmitted in the unsecured manner comprises:
a credit card number being sent in clear text via the proxied request,
a password being sent in clear text via the proxied request, or
predefined protected information associated with the client device.

12. The system of claim 1, wherein determining that the client device is affected by the malware further comprises detecting an absence of another proxied request that is expected to be received from the client device.

13. The system of claim 1, wherein determining that the client device is affected by the malware further comprise detecting that the proxied request is for canary data, the canary data being hidden from a user interface of the client device.

14. A method, comprising:
receiving, via at least one of one or more computing devices, a proxied request from a client device for a network resource from a network site;
determining, via at least one of the one or more computing devices, whether the network resource is correlated with malware based at least in part on a browsing history associated with at least one other client device;
executing, within an execution environment of the one or more computing devices, the network resource in response to determining that the network resource is correlated with malware; and
determining, via at least one of the one or more computing devices, whether the network resource comprises malware based at least in part on the execution of the network resource.

15. The method of claim 14, further comprising sending, via at least one of the one or more computing devices, data generated by the network resource to the client device in response to the proxied request when the network resource is determined not to comprise the malware.

16. The method of claim 14, further comprising sending, via at least one of the one or more computing devices, data encoding a warning to the client device in place of data generated by the network resource to the client device in response to the proxied request when the network resource is determined to comprise the malware.

17. The method of claim 14, further comprising:
analyzing, via at least one of the one or more computing devices, the proxied request to determine whether the proxied request includes protected information transmitted in an unsecured manner; and
determining, via at least one of the one or more computing devices, whether the network resource comprises malware based at least in part on whether the proxied request includes the protected information transmitted in the unsecured manner.

18. The method of claim 17, wherein the one or more computing devices include programmable hardware configured to perform the analyzing, the programmable hardware including at least one of: a field programmable gate array (FPGA), a field programmable object array (FPOA), or a memristor array.

19. The method of claim 14, further comprising:
receiving, via at least one of the one or more computing devices, a user-submitted report identifying the network resource as comprising the malware; and
determining, via at least one of the one or more computing devices, whether the network resource comprises malware based at least in part on the user-submitted report.

20. A non-transitory computer-readable medium embodying a program executable in at least one computing device, wherein when executed the program causes the at least one computing device to at least:
receive a proxied request from a client device for a network resource from a network site;
analyze the proxied request to determine whether the proxied request includes protected information transmitted in an unsecured manner;
determine whether the network resource comprises malware based at least in part on an execution of the network resource or whether the proxied request includes the protected information transmitted in the unsecured manner; and
send data generated by the network resource to the client device in response to the proxied request when the network resource is determined not to comprise the malware.

* * * * *